United States Patent Office 3,736,194
Patented May 29, 1973

3,736,194

METHOD OF PREPARING A COMPOSITE EXPLOSIVE WITH A WATER-WET ENERGETIC COMPOUND

Harry Heller, Silver Spring, Md., assignor to the United States of America as represented by the Secretary of the Navy No Drawing. Filed Feb. 18, 1966, Ser. No. 530,253
Int. Cl. C06b *19/02, 21/00*
U.S. Cl. 149—19 7 Claims The invention described herein may be manufactured and used by or for the Government of the United States of America for governmental purposes without the payment of any royalties thereon or therefor.

This invention pertains to energetic compositions of the composite type and more particularly to an improved process for producing such composites.

A type of energetic composition which is generally used is the composite type and it comprises an energetic compound or compounds dispersed in an organic resin. In most cases, the energetic compound is too sensitive to be handled dry and therefore it is stored in water at the production plant. Presently, prior to shipment the water is removed from the energetic compound and a portion of the resinous binder is coated on it. The coated explosive is then shipped to the loading plant where the rest of the binder is added and the composition is cast and cured. This procedure suffers from the disadvantages that: The energetic compound is dangerous to handle since it contains only a small amount of inert binder; the binder coating on the energetic compound tends to cure or harden so that it no longer can be fabricated into a castable energetic composition, and two operations must be performed in two different plants before the final product is produced.

Accordingly, it is an object of this invention to provide an improved process for producing solid energetic compositions of the composite type.

It is another object of this invention to provide a process for producing solid energetic compositions of the composite type directly from a water-wet energetic compound.

It is a further object of this invention to provide a safer method for producing solid, energetic compositions of the composite type.

It is still another object of this invention to provide a cheaper and more efficient means for producing solid explosives.

These and other objects will become more readily apparent from reading the following detailed description of the invention.

The objects of this invention are accomplished by mixing the water-wet energetic compound directly with the binder components at the loading plant and subsequently removing the water from the resulting mixture. More particularly, the water-wet energetic compound is mixed with at least the essential binder components, in particular a liquid polymer and a liquid cross-linking agent, said components being denser than, insoluble in and higher boiling than water. It is to be understood, that the term binder components includes not only the liquid polymer and cross-linking agent but also any other conventional ingredients used in forming energetic compositions of the composite type; e.g., plasticizers, antioxidants, wetting agents, polymerization catalysts, reinforcing agents, metal oxides, burning rate catalysts, etc., but it is only essential that the liquid polymer and the liquid cross-linking agent have the aforementioned properties.

In practicing the method of this invention all the components excluding the curing catalysts and any binder components which are not denser than, insoluble in and higher boiling than water, are placed in a kettle equipped with a stirrer. The water-wet energetic compound is added to the kettle and after a few minutes of stirring, most of the water rises to the surface where it is removed by decantation, with the remainder of the water being removed by application of a vacuum to the stirred contents of the kettle. After addition of the catalyst and other excluded binder components, the energetic slurry is intimately mixed, cast and cured until an energetic composite is formed. The details of forming such composites such as, the exact proportion of binder components and energetic components, the type of binder and energetic compound, the method of casting and curing, etc., are well known in the art and their details will not be set forth herein.

The process of this invention is operable for forming any type of energetic composition of the composite type wherein the energetic compound must be kept water-wet for storage and/or shipping purposes. The method of this invention is particularly valuable for producing a solid explosive of the composite type wherein the liquid polymer component is an epoxy resin. For the purposes of this invention the term "liquid polymer" is meant to include "epoxy resins" wherein the term "epoxy resin" is an art recognized term employed to embrace compounds having more than one epoxy group per molecule and includes: Cycloaliphatic epoxies; e.g., vinyl cyclohexenediepoxide, 3,4-epoxy - 6 - methylcyclohexylmethyl-3,4-epoxy-6-methyl cyclohexanecarboxylate, etc.; butadiene diepoxide; linear polyethers derived from epihalohydrins; e.g., epichlorohydrin, and polyhydric compounds such as, mononuclear di- and trihydroxy phenols; e.g., resorcinol, catechol, hydroquinone, phloroglucinol, etc.; polynuclear polyhydroxy phenols; e.g., bisphenol A, bisphenol F, trihydroxy diphenyl dimethyl methane, 4,4′-dihydroxybiphenyl, dihydroxyl diphenyl sulfone, novolac resins, etc.; polyalcohols; e.g., ethylene glycol, glycerol, 2,3-butanediol, erythritol, polyethylene glycol, etc.; and the like. The epoxy resin may be cross-linked with any one of a wide variety of cross-linking agents currently used with epoxy resins and preferably, an organic compound having as its sole reacting group, at least two anhydride groups including both aliphatic and aromatic and either saturated or unsaturated acid anhydrides; e.g., succinic, adipic, maleic, tricarballylic, phthalic, pyromellitic, hexahydrophthalic, a methylated maleic adduct of phthalic anhydride, dodecenyl succinic anhydrides and the like. The above cross-linking agents are generally used in such amounts that the anhydride to epoxy ratio ranges from about 0.5:1 to 1.5:1, preferably from about 0.85:1 to 1.1:1. It is generally preferable to utilize a catalyst to accelerate the cure of the epoxy resin binder and from among the well known curing catalysts for epoxy resins there may be mentioned, compounds containing amine and amide functional groups, iron compounds, triphenylphosphine, titanium compounds, and the like.

In preparing an epoxy composite, a water-wet explosive; e.g., RDX, HMX, is stirred into a mixture of the epoxy resin and cross-linking agent. After a few minutes of stirring, about 65% of the water rises to the surface where it is removed by decantation, with the remainder of the water being removed by the application of a vacuum to the stirred contents. After addition of the catalyst and other excluded binder components, the slurry is intimately mixed, cast; e.g., into a warhead, and cured in an oven until a solid energetic composite is formed.

The following examples are illustrative of the invention but they are not to be considered as limiting it in any manner.

EXAMPLE I

A composition was prepared by adding 52.5 grams of DRX wet with 10% water, 23 grams of aluminum powder, 12 grams of dodecenyl succinic anhydride, and 12 grams of epoxy DER–736 (a polyglycol epoxy resin produced by the Dow Chemical Co.) to a small kettle equipped with a stirrer, a vacuum port and a heated jacket. The mixture was stirred for about 10 minutes and the layer of water on the surface was decanted. The mixture was then stirred and heated at 50° C. and evacuated for one hour until all the water was removed. Then 0.5 gram of ferric acetylacetonate was added to the mixture and the slurry was cast into a mold, and heated in an oven for 23 hours at 70° C. until it cured into a solid.

EXAMPLE II

A composition was prepared by adding to a small kettle equipped with a stirrer, vacuum port and a heated jacket, 75 grams of RDX wet with 10% water, 15.5 grams of Epotuf 37–128 (a polyether epoxy resin produced by Reichold Chemical) and 9 grams of methyl nadic anhydride (the methylated maleic adduct of phthalic anhydride). The mixture was stirred for about 10 minutes and a layer of water on the surface was decanted. The lid was replaced on the kettle and the mixture was stirred under the vacuum at 55° C. for 45 minutes until the remaining water was removed. Then 0.5 gram ferric acetylacetonate was added to the mixture and the slurry was cast into a mold and heated for 24 hours at 70° C. until cured.

The process of this invention may be utilized in forming energetic composites from any one of a wide variety of water-wet energetic compounds. The process of this invention is safer in that the energetic compound is never in the dry state and it is more economical in that there is no separate step for the removal of water and no loss of energetic compound due to premature hardening of the binder coating.

Obviously many modifications and variations of the present invention are possible in the light of the above teachings. It is therefore to be understood, that within the scope of the appended claims, the invention may be practiced otherwise than as specifically described.

What is claimed is:

1. A process for producing a solid energetic composition of the composite type wherein an energetic compound is dispersed in a resinous binder comprising:

(a) mixing a water-wet energetic compound with resinous binder components comprising a liquid polymer and a liquid cross-linking agent, said polymer and cross-linking agent being denser than, insoluble in and higher boiling than water, (b) removing water from the mixture and (c) curing said mixture to form a solid energetic composite.

2. The method of claim 1 wherein the water is removed by both decantation and the application of a vacuum to the mixture.

3. The process of claim 1 wherein the energetic compound is a solid explosive.

4. The process of claim 1 wherein said liquid polymer is an epoxy resin and said cross-linking agent is an epoxy resin cross-linking agent.

5. The process of claim 4 wherein the epoxy resin cross-linking agent is an organic compound having as its sole reacting group at least two anhydride groups.

6. The process of claim 5 wherein the energetic compound is an explosive.

7. The process of claim 6 wherein a catalyst is added to the mixture prior to the curing step.

References Cited

UNITED STATES PATENTS

| | | | |
|---|---|---|---|
| 2,946,673 | 7/1960 | Grassie | 264—3 |
| 3,022,149 | 2/1962 | Cramer | 264—3 |
| 3,192,289 | 6/1965 | Jagiello | 149—19 |
| 3,362,859 | 1/1968 | Sutton et al. | 149—92 X |
| 3,440,115 | 4/1969 | Falterman et al. | 149—92 X |

CARL D. QUARFORTH, Primary Examiner

E. A. MILLER, Assistant Examiner

U.S. Cl. X.R.

149—92